United States Patent
Tanaka et al.

(10) Patent No.: US 8,009,933 B2
(45) Date of Patent: Aug. 30, 2011

(54) FAST METHOD OF SUPER-RESOLUTION PROCESSING

(75) Inventors: Masayuki Tanaka, Tokyo (JP); Masatoshi Okutomi, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 1156 days.

(21) Appl. No.: 11/666,605

(22) PCT Filed: Oct. 17, 2005

(86) PCT No.: PCT/JP2005/019437
§ 371 (c)(1),
(2), (4) Date: Apr. 30, 2007

(87) PCT Pub. No.: WO2006/046493
PCT Pub. Date: May 4, 2006

(65) Prior Publication Data
US 2009/0080805 A1    Mar. 26, 2009

(30) Foreign Application Priority Data

Oct. 29, 2004  (JP) ................................. 2004-316154

(51) Int. Cl.
*G06K 9/32* (2006.01)
(52) U.S. Cl. ........................................ 382/299; 382/151
(58) Field of Classification Search ................. 345/613, 345/694, 695, 696; 375/E7.113, E7.26; 382/151, 382/299
See application file for complete search history.

(56) References Cited

U.S. PATENT DOCUMENTS

| | | | |
|---|---|---|---|
| 6,694,064 B1* | 2/2004 | Benkelman | 382/284 |
| 2004/0061710 A1* | 4/2004 | Messing et al. | 345/698 |
| 2004/0170340 A1* | 9/2004 | Tipping et al. | 382/299 |

FOREIGN PATENT DOCUMENTS

JP     10-069537 A    3/1998

OTHER PUBLICATIONS

Michael Elad et al.; A Fast Super-Resolution Reconstruction Algorithm for Pure Translational Motion and Common Space-Invariant Blur; IEEE Transactions on Image Processing; Aug. 1, 2001; pp. 1187-1193; vol. 10, No. 8.*

(Continued)

*Primary Examiner* — Gregory F Cunningham
(74) *Attorney, Agent, or Firm* — Sughrue Mion, PLLC

(57) ABSTRACT

A method is provided for speeding up a super-resolution processing by reducing the number of times for convolution operation that is the number of times for estimation calculation.

A fast method of super-resolution processing for speeding up a super-resolution processing that estimates a high-resolution image from multiple low-resolution images with a displacement, which comprising: a first step for performing a registration of said multiple low-resolution images in a high-resolution image space and treating all pixels of said multiple low-resolution images after the registration as pixels sampled at unequal interval within said high-resolution image space; a second step for dividing said high-resolution image space into multiple small areas with a predefined size; and a third step for defining an estimated value at a predefined representative position within said small area as an estimated value of all pixels that exist within said small area for each small area divided in said second step.

14 Claims, 6 Drawing Sheets

OTHER PUBLICATIONS

Tuan Q. Pham et al.; Super-resolution Fusion using Adaptive Normalized Averaging; 10th Annual Conference of the Advanced School for Computing and Imaging (ASCI); Jun. 2004, XP 002539619; pp. 107-114.*

Hans Knutsson et al.; Normalized and Differential Convolution Methods for Interpolation and Filtering of Incomplete and Uncertain Data; Computer Vision and Pattern Recognition, 1993, Proceedings CVPR 1993, I EEE Computer Society Conference, Jun. 15-17, 1993; pp. 515-523.*

David Capel, Image Mosaicing and Super-resolution; XP 002539621, Section 5.8, 2003, Springer, London; pp. 104-109.*

EP 05795779.7 European search report dated Aug. 14, 2009, reference Q.2EN46, as included in IDS received Sep. 9, 2009.*

Michael Elad et al.; A Fast Super-Resolution Reconstruction Algorithm for Pure Translational Motion and Common Space-Invariant Blur; IEEE Transactions on Image Processing; Aug. 1, 2001; pp. 1187-1193; vol. 10, No. 8.*

Tuan Q. Pham et al.; Super-resolution Fusion using Adaptive Normalized Averaging; 10th Annual Conference of the Advanced School for Computing and Imaging (ASCI); Jun. 2004, XP 002539619; pp. 107-114.*

Hans Knutsson et al.; Normalized and Differential Convolution Methods for Interpolation and Filtering of Incomplete and Uncertain Data; Computer Vision and Pattern Recognition, 1993, Proceedings CVPR 1993, I EEE Computer Society Conference, Jun. 15-17, 1993; pp. 515-523.*

David Capel, Image Mosaicing and Super-resolution; XP 002539621, Section 5.8, 2003, Springer, London; pp. 104-109.*

Michael Elad et al.; A Fast Super-Resolution Reconstruction Algorithm for Pure Translational Motion and Common Space-Invariant Blur; IEEE Transactions on Image Processing; Aug. 1, 2001; pp. 1187-1193; vol. 10, No. 8.

Tuan Q. Pham et al.; Super-resolution Fusion using Adaptive Normalized Averaging; 10th Annual Conference of the Advanced School for Computing and Imaging (ASCI); Jun. 2004, XP 002539619; pp. 107-114.

Hans Knutsson et al.; Normalized and Differential Convolution Methods for Interpolation and Filtering of Incomplete and Uncertain Data; Computer Vision and Pattern Recognition, 1993, Proceedings CVPR 1993, IEEE Computer Society Conference, Jun. 15-17, 1993; pp. 515-523.

Michal Irani et al.; Super Resolution From Image Sequences; Proceedings of the International Conference on Pattern Recognition, Jun. 16-21, 1990; Conference A: Computer Vision and Conference B: pattern Recognition Systems and applications; Proceedings of the International Conference on PAT; vol. ii, Juen 16, 1990; pp. 115-120.

Tony F. Chan et al.; A Nonlinear Primal-Dual Method for Total Variation-Based Image Restoration; Siam Journal on Scientific Computing, vol. 20, No. 6, 1999, XP002539620; pp. 1964-1977.

David Capel, Image Mosaicing and Super-resolution; XP 002539621, Section 5.8, 2003, Springer, London; pp. 104-109.

Min Kyu Park et al., Super-Resolution Image Reconstruction: A Technical Overview; IEEE Signal Processing Magazine; May 1, 2003, vol. 20, No. 3, Piscataway, NJ, US, XP 011097476, pp. 21-36.

Shinichiro Sei, et al., "Super-resolved Image Synthesis for Scene of Multiple Planes with Uncalibrated Moving Camera", The Transactions of the Institute of Electronics, Information and Communication Engineers D-2, vol. J86-D-2, No. 5, pp. 686-691, May 1, 2003, Japan, Abstract.

Masayuki Tanaka, et al., "Fast Algorithm for Reconstruction-based Super-resolution", Information Processing Society of Japan Kenkyu Hokoku, vol. 2004, No. 113, (CVIM-146), pp. 97-104, Nov. 12, 2004, Japan, Abstract.

Moon Gi Kang, et al., "Super-Resolution Image Reconstruction", IEEE Signal Processing Magazine, pp. 19-86, May 2003.

Brian C. Tom, et al., "Reconstruction of A High-Resolution Image by Simultaneous Registration, Restoration, and Interpolation of Low-Resolution Images", IEEE, 1995, pp. 539-542.

Richard R. Schultz, et al., " Extraction of High-Resolution Frames from Video Sequences", IEEE Transactions on Image Processing, vol. 5, No. 6, Jun. 1996.

H. Stark, et al., "High-resolution image recovery from image-plane arrays, using convex projections", vol. 6, No. 11, Nov. 1989, J. Opt. Soc. Am. A pp. 1715-1726.

Barbara Zitova, et al., "Image registration methods: a survey", Image and Vision Computing 21 (2003) 977-1000.

David Capel, Image Mosaicing and Super-resolution, Distinguished Dissertations, CPHC, BCS, Springer, pp. 81-169.

William H. Press, et al., Numerical Recipes in C++, The Art of Scientific Computing, Second Edition, pp. 398-461.

Masao Shimizu, et al., "Two-Dimensional Simultaneous Sub-Pixel Estimation for Area-Based Matching", D-2, vol. J87-D-2, No. 2, pp. 554-564, 2004/2, Japan, Abstract.

Masao Shimizu, et al., "Precise Simultaneous Estimation of Deformation N-Parameters Extended from Two-Dimensional Simultaneous Estimation", IPSJ SIG Technical Report, 2004-CVIM-143 (11), 2004/3/5 pp. 81-88, Abstract.

* cited by examiner

FIG.3
(A)
(B)
(C)
(D)

FIG.5
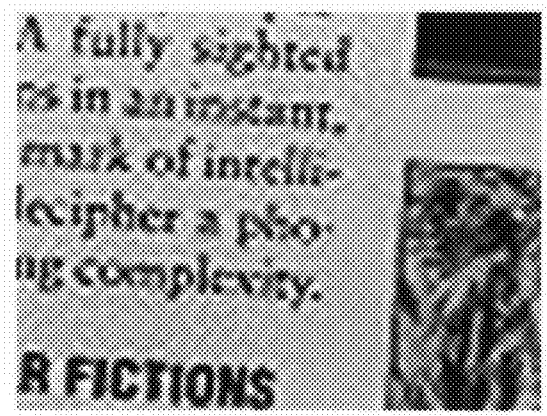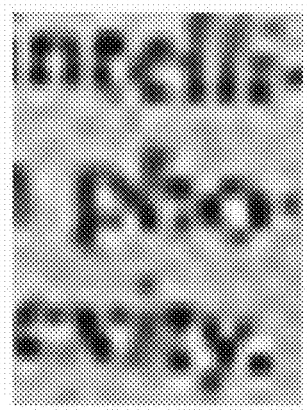
(A)
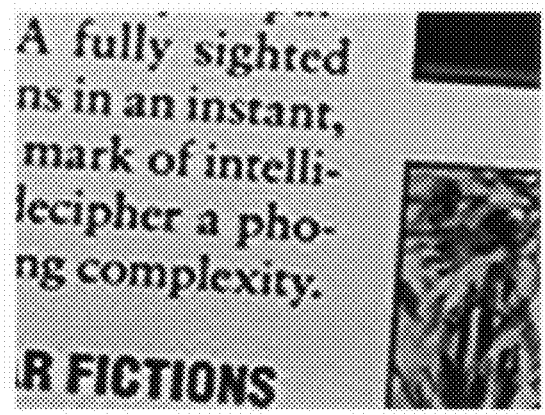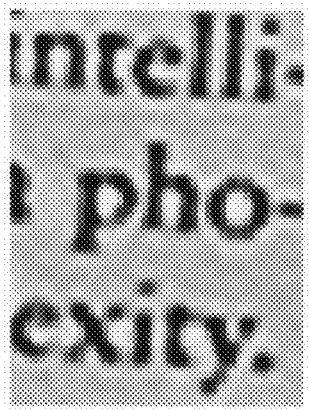
(B)
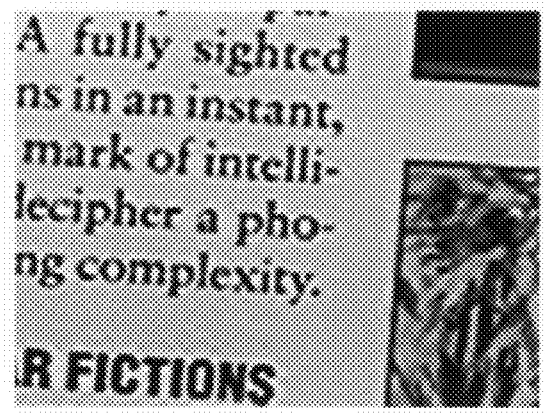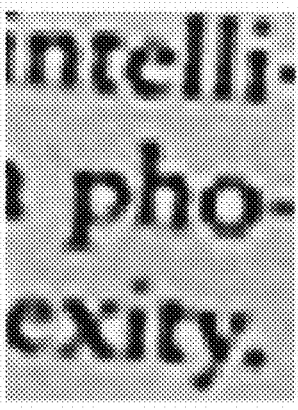
(C)

FAST METHOD OF SUPER-RESOLUTION PROCESSING

TECHNICAL FIELD

The present invention relates to a fast method of super-resolution processing for speeding up super-resolution processing which estimates one high-resolution image from multiple low-resolution images, and in particular relates to a fast method of super-resolution processing which realizes speedup of the super-resolution processing by reducing the number of estimations in the reconstruction-based super-resolution processing.

BACKGROUND TECHNIQUE

In recent years, many studies have been reported with regard to the super-resolution processing which estimates one high-resolution image from multiple low-resolution images having the displacement (see Non-Patent Document 1). Various methods of the super-resolution processing, for example, the ML (Maximum-Likelihood) method disclosed in Non-Patent Document 2, the MAP (Maximum A Posterior) method disclosed in Non-Patent Document 3, and the POCS (Projection Onto Convex Sets) method disclosed in Non-Patent Document 4 have been proposed.

The ML method is a method which defines an evaluation function as square error between the pixel value of a low-resolution image estimated from a high-resolution image and the actually observed pixel value, and obtains a high-resolution image by minimizing the evaluation function as an estimated image. In other words, the ML method is a super-resolution processing method based on the principle of maximum likelihood estimation.

The MAP method is a method which estimates the high-resolution image by minimizing the evaluation function which added probability information of the high-resolution image to square error. In other words, the MAP method is a super-resolution processing method which uses certain prior information regarding the high-resolution image to estimate the high-resolution image as an optimization problem that maximizes posterior probability.

The POCS method is a super-resolution processing method which generates simultaneous equations regarding the pixel values of the low-resolution image and the high-resolution image, and obtains a high-resolution image by solving the simultaneous equations successively.

All of the above-described super-resolution processing methods have the common features of presupposing a high-resolution image and estimating its pixel value for each pixel of all low-resolution images based on point-spread function (PSF) obtained from camera model from the presupposed high-resolution image so that these methods can search for a high-resolution image by minimizing the difference between the estimated value and the observed pixel value (the observed value). Therefore, these super-resolution processing methods are called reconstruction-based super-resolution processing methods.

One of the common features of the reconstruction-based super-resolution processing method is having a very high dimensional problem with an unknown number of the pixels of the high-resolution image, and another feature is the necessity to estimate low-resolution image from the high-resolution image for all pixels of multiple low-resolution images.

In the reconstruction-based super-resolution processing method, since the dimension of the unknown number of the pixels of the high-resolution image is very high, it is unrealistic to analytically derive the high-resolution image and thus the high-resolution image is estimated by iterative calculations. In addition, the iterative calculations need to estimate all pixels of the low-resolution images for one cycle. Therefore it is well known that there is a large calculation cost problem. That is to say, since the calculation cost of the reconstruction-based super-resolution processing is very large, a main problem of the existing super-resolution processing methods is to reduce the large calculation cost.

Moreover, the super-resolution processing defines square error between the estimated value and the observed value as the evaluation function of the estimated error, and estimates the high-resolution image as a result of the optimization calculation. Therefore, the evaluation function of square error and the derivative value of the evaluation function need to be calculated for the optimization calculation.

As described above, in the existing super-resolution processing methods, in order to calculate the evaluation function of square error and the derivative value of the evaluation function, it is necessary to calculate the estimated values corresponding to the observed values of all pixels of multiple low-resolution images. Therefore, it is necessary to estimate the total pixels time of multiple low-resolution images. Although the estimating calculation has been formulated as a convolution operation with the point-spread function (PSF) corresponding to the transfer function obtained from the camera model, it is necessary to perform the convolution operation for all pixels of multiple low-resolution images. Therefore, the total pixel number of multiple low-resolution images used in the super-resolution processing generally becomes 8,000 to 800,000, resulting in a very large calculation cost needed to execute the estimation.

The present invention has been developed in view of the above-described circumstances, and an object of the present invention is to provide a fast method of super-resolution processing which realizes speedup of the super-resolution processing by reducing the number of times of the convolution operations that is the number of times of estimation.

DISCLOSURE OF INVENTION

The present invention relates to a fast method of super-resolution processing for speeding up a super-resolution processing that estimates a high-resolution image from multiple low-resolution images with a displacement. The above object of the present invention is effectively achieved by comprising: a first step for performing a registration of said multiple low-resolution images in a high-resolution image space and treating all pixels of said multiple low-resolution images after the registration as pixels sampled at unequal interval within said high-resolution image space; a second step for dividing said high-resolution image space into multiple small areas with a predefined size; and a third step for defining an estimated value at a predefined representative position within said small area as an estimated value of all pixels that exist within said small area for each small area divided in said second step. The above object of the present invention is also effectively achieved by the construction that said small area has a shape of a square. The above object of the present invention is also effectively achieved by the construction that the size of one side of said square is a fraction of a integer-th of the pixel size of the high-resolution image. The above object of the present invention is also effectively achieved by the construction that said estimated value of said third step is a value obtained by estimating a convolution of said high-resolution image and a point-spread function obtained from a camera model.

Further, the above object of the present invention is also effectively achieved by the construction that an evaluation function required for said super-resolution processing is expressed by the following expression:

$$I = \sum_{i=1}^{M} |f_i - \hat{f}(x_c, y_c)|^2$$

where, I represents said evaluation function for said small area, M represents the number of all pixels that belong to said small area, $f_i$ represents an observed value of an i-th pixel with a position coordinate $(x_i, y_i)$ within said small area, $(x_c, y_c)$ represents a representative position of said small area, and $\hat{f}(x_c, y_c)$ represents said estimated value of said representative position. The above object of the present invention is also effectively achieved by the construction that an evaluation function required for said super-resolution processing is expressed by the following expression:

$$I = M|\tilde{f} - \hat{f}(x_c, y_c)|^2$$

here, the following expression is holds:

$$\tilde{f} = \frac{1}{M} \sum_{i=1}^{M} f_i$$

where, I represents said evaluation function for said small area, M represents the number of all pixels that belong to said small area, $f_i$ represents an observed value of an i-th pixel with a position coordinate $(x_i, y_i)$ within said small area, $(x_c, y_c)$ represents a representative position of said small area, $\hat{f}(x_c, y_c)$ represents said estimated value of said representative position, and $\tilde{f}$ represents an average of said observed values of pixels within said small area. The above object of the present invention is also effectively achieved by the construction that an evaluation function required for said super-resolution processing is expressed by the following expression:

$$I = \sum_{i=1}^{M} w(x_i - x_c, y_i - y_c) |f_i - \hat{f}(x_c, y_c)|^2$$

where, I represents said evaluation function for said small area, M represents the number of all pixels that belong to said small area, $f_i$ represents an observed value of an i-th pixel with a position coordinate $(x_i, y_i)$ within said small area, $(x_c, y_c)$ represents a representative position of said small area, $\hat{f}(x_c, y_c)$ represents said estimated value of said representative position, and $w(x_i - x_c, y_i - y_c)$ is a weight function that represents a weight corresponding to said i-th pixel with said position coordinate $(x_i, y_i)$ within said small area and the value becomes smaller as said i-th pixel with said position coordinate $(x_i, y_i)$ draws away from said representative position $(x_c, y_c)$. The above object of the present invention is also effectively achieved by the construction that an evaluation function required for said super-resolution processing is expressed by the following expression:

$$I = W|\tilde{f} - \hat{f}(x_c, y_c)|^2$$

here, the following expressions are hold:

$$W = \sum_{i=1}^{M} w(x_i - x_c, y_i - y_c)$$

$$\tilde{f} = \frac{1}{W} \sum_{i=1}^{M} w(x_i - x_c, y_i - y_c) f_i$$

where, I represents said evaluation function for said small area, M represents the number of all pixels that belong to said small area, $f_i$ represents an observed value of an i-th pixel with a position coordinate $(x_i, y_i)$ within said small area, $(x_c, y_c)$ represents a representative position of said small area, $\hat{f}(x_c, y_c)$ represents said estimated value of said representative position, $w(x_i - x_c, y_i - y_c)$ is a weight function that represents a weight corresponding to said i-th pixel with said position coordinate $(x_i, y_i)$ within said small area and the value becomes smaller as said i-th pixel with said position coordinate $(x_i, y_i)$ draws away from said representative position $(x_c, y_c)$, W is a total of said weight corresponding to each pixel within said small area, and $\tilde{f}$ represents a weighted average of said small area.

BRIEF DESCRIPTION OF THE DRAWINGS

FIG. 3(A) is a diagram showing a high-resolution image as a true value, FIG. 3(B) is a diagram which shows one of the low-resolution images enlarged to the size of the high-resolution image, FIG. 3(C) is a diagram showing the result of the super-resolution processing by the conventional super-resolution processing method, FIG. 3(D) is a diagram showing the result of the super-resolution processing by the fast method of super-resolution processing according to the present invention;

FIG. 5 is a diagram showing a result of the super-resolution processing by using actual image (1), FIG. 5(A) is a diagram which shows a low-resolution image enlarged to the size of the high-resolution image, FIG. 5(B) is a diagram showing the high-resolution image estimated by the conventional super-resolution processing method, FIG. 5(C) is a diagram showing the high-resolution image estimated by the fast method of super-resolution processing according to the present invention; FIG. 6(A) is a diagram which shows a low-resolution image enlarged to the size of the high-resolution image, FIG. 6(B) is a diagram showing the high-resolution image estimated by the conventional super-resolution processing method, FIG. 6(C) is a diagram showing the high-resolution image estimated by the fast method of super-resolution processing according to the present invention, FIG. 6(D) is a diagram showing the high-resolution image estimated by the conventional super-resolution processing method where the deformation of the PSF has been taken into consideration.

THE BEST MODE FOR CARRYING OUT THE INVENTION

With reference to the drawings, the preferred embodiment of the present invention is described hereinafter.

Before describing the details of the present invention, an overview of a conventional super-resolution processing will be described.

A super-resolution processing means a processing which estimates a high-resolution image from multiple low-resolution images with the displacement that is the observed image.

Here, "a space of a high-resolution image to be reconstructed" is referred to as "a high-resolution image space".

Figure 1:
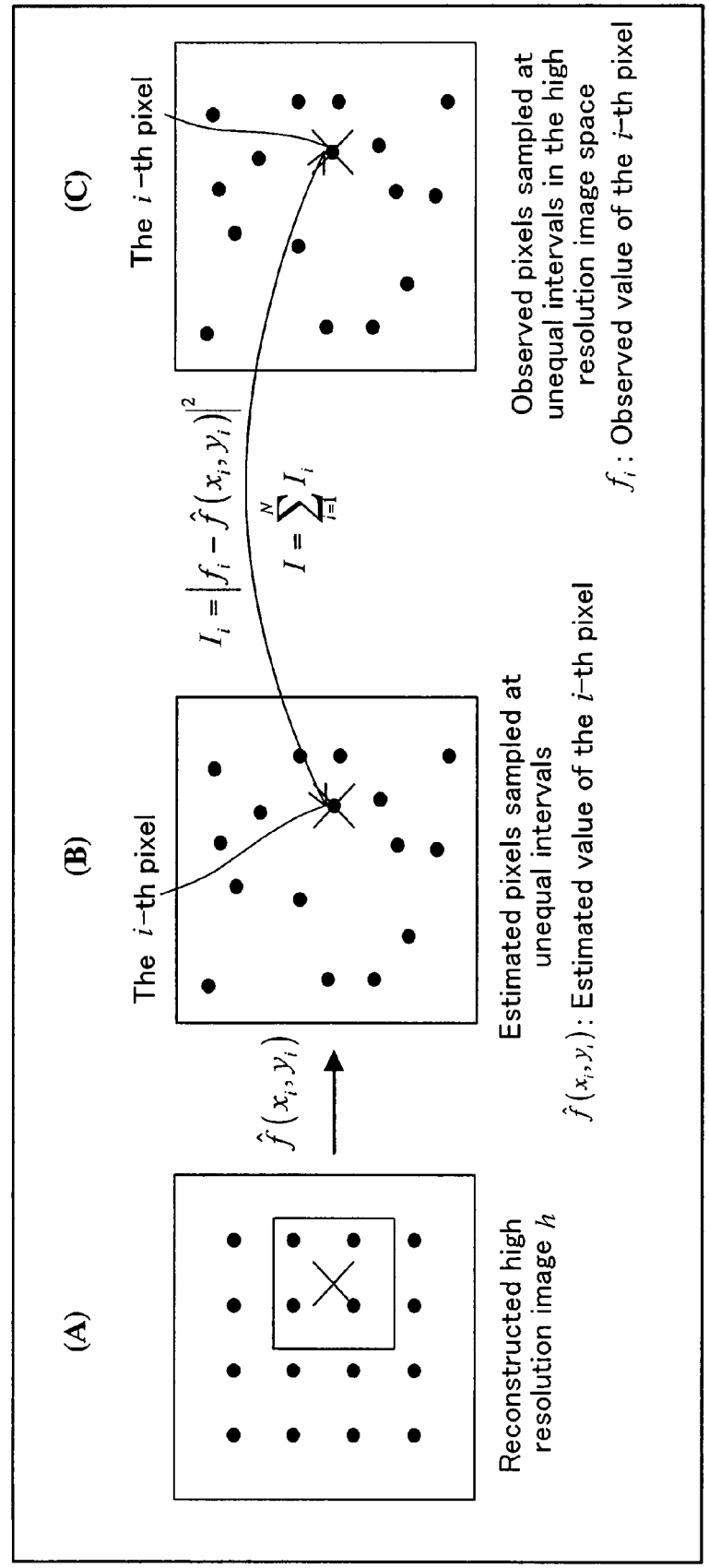
FIG. 1 is a conceptual diagram describing the concept of the super-resolution processing by a conventional super-resolution processing method.

After the registration of multiple low-resolution images with the displacement is executed in the high-resolution image space, as shown in FIG. 1(C), it is possible to deal with the data of all observed images (that is, the pixels of all observed images) as the sampled data at unequal interval in the high-resolution image space. That is, it is possible to regard multiple low-resolution images registered in the high-resolution image space as sampled pixels at unequal interval.

Here, the position of the i-th pixel after the registration, i.e. the position of the i-th data after multiple observed images (that is, multiple low-resolution images) are registered, is defined as the coordinate $(x_i, y_i)$, and its pixel value is defined as $f_i$. That is, the pixel value of the i-th pixel after the registration (hereinafter simply referred to as the i-th pixel) which is observed in the high-resolution image space (hereinafter simply referred to as an observed value) is defined as $f_i$.

The number of data after multiple observed images are registered, is equal to the number of data sampled at unequal interval in the high-resolution image space, i.e. corresponds to the number of pixels (the number of picture elements) of all observed images.

Furthermore, in the case of defining the high-resolution image as h(x,y), it is possible to estimate the pixel value of the i-th pixel with the position coordinate $(x_i, y_i)$ as the convolution of the point-spread function (PSF) obtained from the camera model and the high-resolution image h(x,y). The estimated pixel value of the i-th pixel obtained by this convolution operation (hereinafter simply referred to as the estimated value) is defined as $\hat{f}_i (\hat{f}_i = \hat{f}(x_i, y_i))$.

Therefore, the reconstruction-based super-resolution processing method is a method which adjusts the high-resolution image h(x,y) in a way that the total of square errors of the observed value for each pixel and its estimated value can be minimized for all pixels after multiple observed images are registered (where, the number of all pixels is N.).

If the total of square errors of the observed value for all pixels after multiple observed images are registered and its estimated value is expressed in a numerical formula, it seems to become the following Expression 1.

$$I = \sum_{i=1}^{N} |f_i - \hat{f}(x_i, y_i)|^2 \quad \text{[Expression 1]}$$

Where, I represents the sum of square errors of the observed value for all pixels after multiple observed images are registered and its estimated value, that is, I is the evaluation function for evaluating the estimated error of the reconstruction-based super-resolution processing. In addition, N represents the number of data sampled at unequal interval in the high-resolution image space, that is, N is the number of all pixels of all observed images (low-resolution images). $f_i$ represents the observed value (the observed data) of the i-th pixel with the position coordinate $(x_i, y_i)$. $\hat{f}_i$ represents the estimated value of the i-th pixel with the position coordinate $(x_i, y_i)$.

As understood from the Expression 1, in the conventional super-resolution processing method, in order to compare the observed values (the observed data) with the estimated values, it is necessary to estimate $\hat{f}_i$ from the high-resolution image h(x,y) for all pixels after multiple observed images are registered, that is, the number of times for estimating is equal to N times (where, N is the number of the sampled data at unequal interval in the high-resolution image space).

However, it is well known that the calculation cost for estimating $\hat{f}_i$ from the high-resolution image h(x,y), that is, the calculation cost of the convolution operation, is large.

Figure 2:
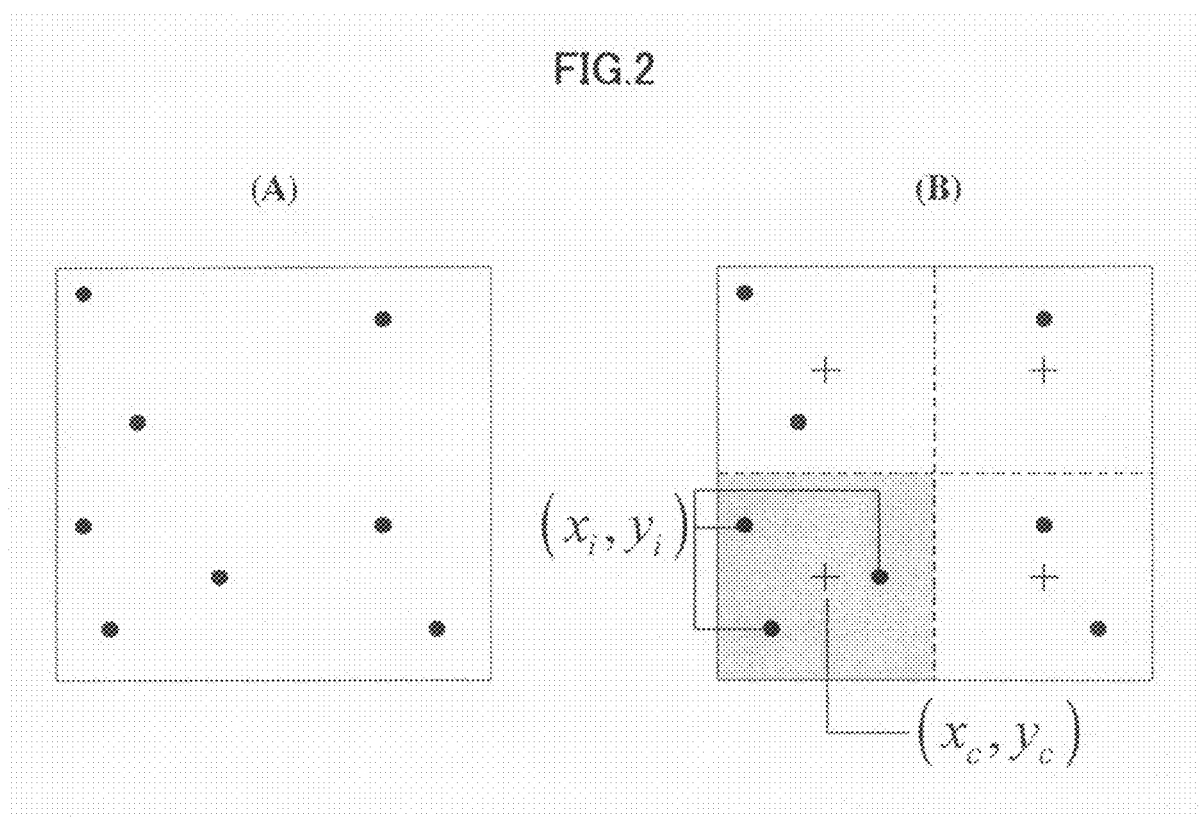
FIG. 2 is a conceptual diagram describing the concept of a super-resolution processing by the fast method of super-resolution processing according to the present invention.

Briefly, in the conventional super-resolution processing method which uses the evaluation function expressed by the Expression 1, for example, as shown in FIG. 2(A), after the registration of multiple low-resolution images is executed in the high-resolution image space, when the data sampled at unequal interval was observed in the high-resolution image space, as described above, it is necessary to execute the estimation calculation (convolution operation) as many times as the number of the observed data (that is, the number of all pixels of all low-resolution images that were registered). In the case of FIG. 2(A), since there are eight the observed data in the high-resolution image space, in order to calculate the evaluation function, 8 times of convolution operations are necessary.

Therefore the present invention realizes the reduction of the calculation cost required for the estimation by reducing the number of times for convolution operations i.e. the number of times for estimation, and so made speeding up of the super-resolution processing possible.

The details of the fast method of super-resolution processing according to the present invention will now be described below.

The fast method of super-resolution processing according to the present invention defines all pixels after the registration of multiple low-resolution images with the displacement is executed in the high-resolution image space as pixels distributed at unequal interval in the high-resolution image space, and then divides the high-resolution image space into multiple small areas with a predefined size. For each divided small area, the estimated values of all pixels that belong to such a small area are approximated by the representative estimated value (hereinafter simply referred to as the representative value) of the representative point (hereinafter simply referred to as the representative position) which has a predefined position in the small area, so that the number of times for estimation required for the super-resolution processing can be reduced, and thus constitutes the major characteristic of the present invention.

Here, for example, as shown in FIG. 2(A), since there are eight the observed data in the high-resolution image space, when the fast method of super-resolution processing according to the present invention is applied, for example, as shown in FIG. 2(B), the high-resolution image space can be divided into four small areas. That is, the high-resolution image space is divided into small areas with a predefined size.

A different pixel that belongs to the high-resolution image space, in other words, a pixel with a different coordinate (x,y) consequently has a different estimated value. However, the present invention presupposes that the estimated values of all pixels belonging to the small area do not vary within each divided small area. That is, in the present invention, the estimated values of all pixels belonging to the small area are approximated by the representative value of the representative point in the small area.

Accordingly, multiple observed data within each small area, in other words, multiple pixels belonging to each small area require only one estimation calculation to compare the observed data with the (approximate) estimated value. In short, the error calculation for multiple observed data within a certain small area, that is, the calculation of the evaluation function, can be achieved by the estimation from one convolution operation.

If a certain divided small area, for example, the shaded small area shown in FIG. 2(B), is regarded as a attention area, since there are 3 pieces of the observed data in the attention area, when the fast method of super-resolution processing according to the present invention is applied, these 3 pieces of the observed data can be compared by one estimation calculation. That is, the estimations for these 3 pieces of the observed data are carried out by one convolution operation.

On the other hand, in order to compare with these 3 pieces of the observed data, the conventional super-resolution processing method requires three times of estimation calculation as many times as the number of the observed data. That is, with regard to this attention area, a process three times faster than the conventional super-resolution processing method can be expected by applying the fast method of super-resolution processing according to the present invention.

If the total of square errors with regard to the attention area, that is, the evaluation function for the attention area, is expressed in a numerical formula, the conventional super-resolution processing method seems to become the following Expression 2, and the fast method of super-resolution processing according to the present invention seems to becomes the following Expression 3.

$$I = \sum_{i=1}^{M} |f_i - \hat{f}(x_i, y_i)|^2$$ [Expression 2]

$$I = \sum_{i=1}^{M} |f_i - \hat{f}(x_c, y_c)|^2$$ [Expression 3]

Where, in the Expression 2 and the Expression 3, I represents the sum of square errors between the observed value and its estimated value for all pixels within the attention area, that is, I is the evaluation function for the attention area. M represents the number of data sampled at unequal interval within the attention area, that is, M is the number of all pixels that belong to the attention area. $f_i$ represents the observed value (the observed data) of the i-th pixel with the position coordinate $(x_i, y_i)$ within the attention area. $\hat{f}(x_i, y_i)$ represents the estimated value of the i-th pixel with the position coordinate $(x_i, y_i)$ within the attention area. $(x_c, y_c)$ represents the representative position of the attention area. $\hat{f}(x_c, y_c)$ represents the estimated value of the representative position.

As understood from the Expression 3, since the estimated value of the representative position of the attention area is a constant value, the present invention requires one estimation calculation even if the number M of the observed data within the attention area varies. On the other hand, as understood from the Expression 2, the conventional super-resolution processing method requires estimation calculations of as many times as the number of the observed data within the attention area (for example, in the case of the shaded attention area shown in FIG. 2(B), it will be three times of estimation calculations).

The fast method of super-resolution processing according to the present invention includes the following procedure (i.e. Step 1 to Step 5 will be further described later) for calculating the evaluation function I that is necessary for the super-resolution processing. In addition, in the present invention, the derivative value of the evaluation function that is necessary for the super-resolution processing also calculated by using the same procedure as the calculation of the evaluation function.

Step 1:

The high-resolution image space is divided into multiple small areas with a predefined size.

Step 2:

The initial value of the evaluation function is set. That is I=0.

Step 3:

For a certain small area, when the pixels belonging to the small area exist, that is, when the observed data exists within the small area, the estimation by convolution operation is performed only for the representative point (representative position) of the small area. Then, for all pixels within the small area, the square of the difference between the observed value of the pixel (the observed data) and the estimated value of the representative point is added to the evaluation function I. On the other hand, when there is no the observed data within the small area, no action is taken for the evaluation function I.

Step 4:

Move to the next small area.

Step 5:

Repeats Step 3 and Step 4 for all divided small areas.

Now, in the present invention, the method for dividing the high-resolution image space into small areas will be described as follows.

The fast method of super-resolution processing according to the present invention divides the high-resolution image space into multiple small areas with a predefined shape. For example, the high-resolution image space can be divided into multiple small square areas.

The estimation calculation of the super-resolution processing can be expressed as a convolution operation of the PSF (Point-spread function) obtained from the camera model. For example, when the divided small area has a square shape, if the size of one side of the small area (square) is a fraction of a integer-th of the pixel size of the high-resolution image (that is, 1/L, where L is an integer.), the kind of PSF kernel is determined to be $L^2$ by taking into consideration the registration pixel-by-pixel.

Therefore, in the present invention, it is preferable to define the size of the small area with a square shape as a fraction of a integer-th of the pixel size of the high-resolution image.

The above description was provided where the small area had a square shape. However, the present invention does not limit the small area to being a square shape; for example, the high-resolution image space can be divided into small areas with other geometric shapes, such as a rectangle.

Further, in the present invention, it is possible to use the evaluation function I as expressed by the following Expression 4.

$$I = M|\bar{f} - \hat{f}(x_c, y_c)|^2$$ [Expression 4]

Where, the following Expression 5 holds.

$$\tilde{f} = \frac{1}{M}\sum_{i=1}^{M} f_i \quad \text{[Expression 5]}$$

Where, in the Expression 4 and the Expression 5, I represents the evaluation function for the attention area. M represents the number of data sampled at unequal interval within the attention area, in other words, M is the number of all pixels that belong to the attention area. $f_i$ represents the observed value (the observed data) of the i-th pixel with the position coordinate $(x_i,y_i)$ within the attention area. $(x_c,y_c)$ represents the representative position of the attention area. $\hat{f}(x_c,y_c)$ represents the estimated value of the representative position. $\tilde{f}$ represents the average of the observed values of pixels within the attention area.

Since the present invention approximates the estimated values of all pixels that belong to the attention area to be constant within this attention area (i.e. within the predefined small area), the reliability of the representative estimated value decreases as pixels belonging to the attention area draw away from the representative position of the attention area. In consideration of the above matter, in the present invention, it is possible to use the evaluation function I as expressed by the following Expression 6 by adding a weight to square error between the observed value and its estimated value for each pixel within the attention area.

$$I = \sum_{i=1}^{M} w(x_i - x_c, y_i - y_c)\left|f_i - \hat{f}(x_c, y_c)\right|^2 \quad \text{[Expression 6]}$$

Where, in the Expression 6, I represents the evaluation function for the attention area. M represents the number of data sampled at unequal interval within the attention area, in other words, M is the number of all pixels that belong to the attention area. $f_i$ represents the observed value (the observed data) of the i-th pixel with the position coordinate $(x_i,y_i)$ within the attention area. $(x_c,y_c)$ represents the representative position of the attention area. $\hat{f}(x_c,y_c)$ represents the estimated value of the representative position. $w(x_i-x_c,y_i-y_c)$ is a weight function that represents the weight corresponding to the i-th pixel with the position coordinate $(x_i,y_i)$ within the attention area, and the value becomes smaller as the i-th pixel with the position coordinate $(x_i,y_i)$ draws away from the representative position $(x_c,y_c)$.

Further, in the present invention, when square error of each pixel within the attention area is deformed, that is, it is possible to obtain the following Expression 7 by removing the constant component of the Expression 6. That is to say, in the present invention, it is possible to use the evaluation function I as expressed by the following Expression 7.

$$I = W|\tilde{f} - \hat{f}(x_c, y_c)|^2 \quad \text{[Expression 7]}$$

Where, the following Expression 8 and the following Expression 9 are hold.

$$W = \sum_{i=1}^{M} w(x_i - x_c, y_i - y_c) \quad \text{[Expression 8]}$$

$$\tilde{f} = \frac{1}{W}\sum_{i=1}^{M} w(x_i - x_c, y_i - y_c)f_i \quad \text{[Expression 9]}$$

Where, in the Expression 7, the Expression 8, and the Expression 9, I represents the evaluation function for the attention area. M represents the number of data sampled at unequal interval within the attention area, in other words, M is the number of all pixels that belong to the attention area. $f_i$ represents the observed value (the observed data) of the i-th pixel with the position coordinate $(x_i,y_i)$ in the attention area. $(x_c,y_c)$ represents the representative position of the attention area. $\hat{f}(x_c,y_c)$ represents the estimated value of the representative position. $w(x_i-x_c,y_i-y_c)$ is a weight function that represents the weight corresponding to the i-th pixel with the position coordinate $(x_i,y_i)$ within the attention area, and the value becomes smaller as the i-th pixel with the position coordinate $(x_i,y_i)$ draws away from the representative position $(x_c,y_c)$. W is the total of the weights corresponding to each pixel within the attention area. $\tilde{f}$ represents the weighted average of the attention area.

Further, When the observed images are given and the divided small areas are set, since W and $\tilde{f}$ are uniquely determined, so these will not vary during the super-resolution processing. Then, When the Expression 6 is compared with the Expression 7, it can be clearly seen that the amount of calculation for the Expression 7 is less.

As described above, the fast method of super-resolution processing according to the present invention has the feature that aims for the efficiency of the calculation necessary for each repetition.

Briefly, the fast method of super-resolution processing according to the present invention realizes speeding up of the super-resolution processing, by first performing the registration of multiple low-resolution images with the displacement in the high-resolution image space and treating the observed multiple low-resolution images after the registration as the pixels sampled at unequal interval within the high-resolution image space, and then dividing the high-resolution image space into multiple small areas and approximating that the value estimated from the high-resolution image is a constant value within each divided small area.

In addition, in the fast method of super-resolution processing according to the present invention, with regard to the matching for the registration of multiple low-resolution images with the displacement, for example, since there are many methods such as disclosed in Non-Patent Document 5, the present invention can use these existing matching methods.

Next, in order to verify the significant speeding up effect of the super-resolution processing by the present invention, first, for a synthetic image, a result of the super-resolution processing to which the fast method of super-resolution processing according to the present invention is applied, and a result of the super-resolution processing by a conventional super-resolution processing method are described.

In order to compare the result of the super-resolution processing by the conventional super-resolution processing method with the result of the super-resolution processing by the fast method of super-resolution processing according to the present invention, a part of the reference image of ISO/DIS12640(ISO400) was assumed to be the true high-resolution image, and the Gaussian PSF ($\sigma$=0.3) was presupposed, 64 synthetic images (80×60) were used as multiple low-resolution images.

FIG. 3(A) shows the high-resolution image as the true value, and FIG. 3(B) shows one of the low-resolution images enlarged to the size of the high-resolution image. The magnification of the high-resolution image was set to 3.2, and the high-resolution image with the size of 256×192 was reconstructed by the MAP method. A 4-neighbor MRF was assumed in the constraint term of the MAP method (see Non-Patent Document 6) and the constraint parameter a was set to 0.05. Moreover, the Conjugate Gradient method of Fletcher-Reeves was used for the optimization calculation (see Non-Patent Document 7), and the image enlarged by Bicubic interpolation from the low-resolution image that is a reference image was used as an initial image. The main calculation conditions are summarized in TABLE 1.

TABLE 1

Calculation conditions

| | |
|---|---|
| Size of low-resolution image | 80 × 60 |
| Number of low-resolution images | 64 |
| Magnification | 3.2 |
| Size ratio of small area | 3 |
| a | 0.05 |
| Iteration | 20 |

FIG. 3(C) shows the result of the super-resolution processing by the conventional super-resolution processing method, and FIG. 3(D) shows the result of the super-resolution processing by the fast method of super-resolution processing according to the present invention.

First, as a subjective evaluation, both FIG. 3(C) and FIG. 3(D) appeared to have an improved resolution when they are compared with FIG. 3(B). Moreover, FIG. 3(C) and FIG. 3(D) do not seem to be different from each other.

Next, with regard to three kinds of super-resolution processing methods including the super-resolution processing by the conventional super-resolution processing method in which sufficient memory is available (hereinafter simply referred to as the conventional super-resolution processing method (a)), the super-resolution processing by the conventional super-resolution processing method in which sufficient memory is not available (hereinafter simply referred to as the conventional super-resolution processing method (b)), and the super-resolution processing by the fast method of super-resolution processing according to the present invention (hereinafter simply referred to as the present invention's super-resolution processing method (c)), in order to compare the number of PSF kernels, the number of times for convolution operation, and computation time, TABLE shows the preprocessing time required for generation of the PSF kernels, the time required for the iteration optimization and an RMS error from the true value that quantitatively evaluates image quality of the high-resolution images respectively.

TABLE 2

Comparison between the conventional super-resolution processing method and the present invention's super-resolution processing method (in the case of using synthetic image)

| | Super-resolution processing method | | |
|---|---|---|---|
| | (a) | (b) | (c) |
| Number of PSF kernels | 307200 | 307200 | 9 |
| Number of times for convolution operation | 307200 | 307200 | 221952 |

TABLE 2-continued

Comparison between the conventional super-resolution processing method and the present invention's super-resolution processing method (in the case of using synthetic image)

| | Super-resolution processing method | | |
|---|---|---|---|
| | (a) | (b) | (c) |
| Preparation time [sec] | 0.2 | 11.1 | 0.3 |
| Iteration time [sec] | 391.9 | 13.7 | 8.6 |
| Total computation time [sec] | 392.9 | 24.8 | 8.9 |
| Total time ratio | 44.1 | 2.8 | 1.0 |
| RMS error | 2.81 | 2.81 | 2.97 |

Further, in order to compare computing speeds of above three kinds of super-resolution processing method, TABLE 2 also shows the ratio when the computation time of the super-resolution processing by the fast method of super-resolution processing according to the present invention is defined as "1". The Pentium 4 (Registered Trademark) 2.8 GHz was used for the CPU of the computer used in the super-resolution processing.

When the comparison of computation times shown in TABLE 2 is performed, it is clear that as for the process of the present invention, it is speeded up 44.1 times in comparison with the process of the conventional super-resolution processing method (a), and speeded up 2.8 times in comparison with the process of the conventional super-resolution processing method (b). Moreover, with regard to the output image (the reconstructed high-resolution image), when the fast method of super-resolution processing according to the present invention is compared with the conventional super-resolution processing method, RMS error is slightly increased. However, the difference is only 0.16, verifying that there is practically no difference.

Figure 4:
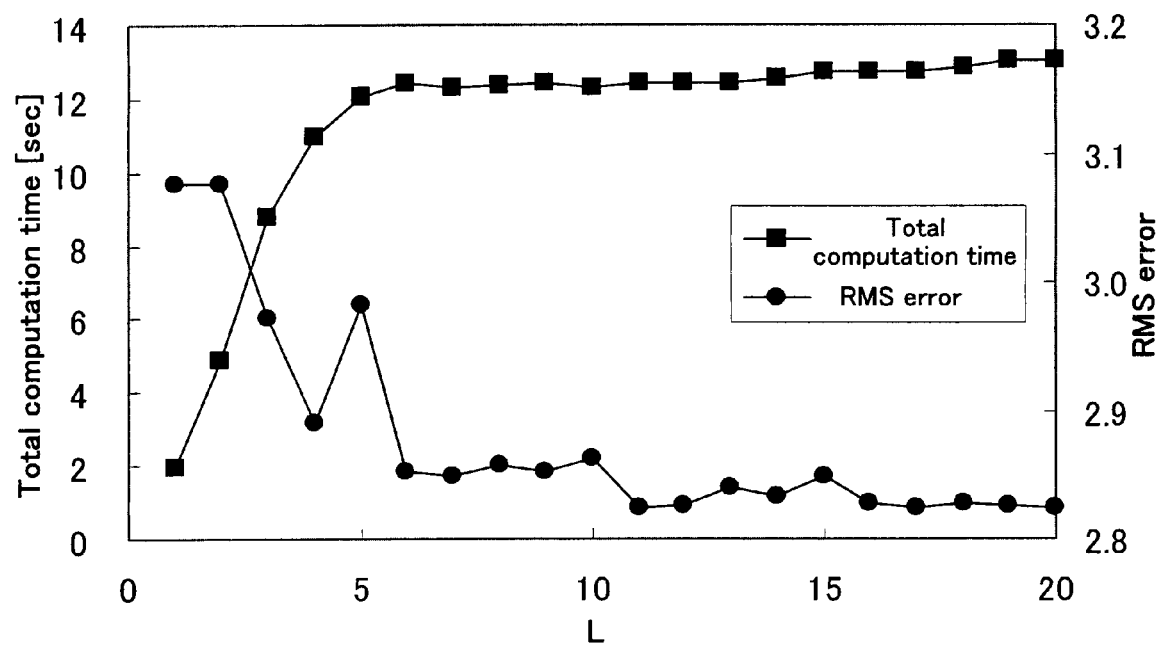
FIG. 4 is a diagram showing the relationship between the size of the divided small area and computation time, the RMS error in the super-resolution processing by the fast method of super-resolution processing according to the present invention.

Next, in order to compare the size (that is, 1/L, where L is an integer.) of the small area where the approximation is performed by the fast method of super-resolution processing according to the present invention with the accuracy of the reconstructed high-resolution image and the computation time required for the calculation of the high-resolution image, similar super-resolution processing was performed by setting the size of the small area (1/L) as a parameter. FIG. 4 shows the relationship between RMS error of the output image (the reconstructed high-resolution image) from the true value, the computation time required for the calculation of the high-resolution image and the size of the divided small area.

As understood from FIG. 4, it is found that there is a tradeoff relationship between RMS error and the computation time when the size of the small area is set as a parameter. In addition, because the number of times for convolution operation which is performed in the fast method of super-resolution processing according to the present invention is certainly equal to or less than the number of times for convolution operation which is performed in the conventional super-resolution processing method, the number of times for convolution operation reaches upper limit and as a result the computation time converges on around L=6 (where the size of the divided small area is ⅙, i.e. 1/L=⅙). Then, with regard to RMS error, the variation seems to be small when L is equal to or more than 6.

Next, by using actual images, the result of the super-resolution processing by the fast method of super-resolution processing according to the present invention and the result of the super-resolution processing by the conventional super-resolution processing method are described.

An imaging device (a camera) which is a Sony (Registered Trademark) VX2000, was used to take the moving images, and after the color image was converted into a gray scale image with 8-bit gradation, the super-resolution processing was performed under the conditions shown in TABLE 1. The camera was fixed and the photographic subject was moved in parallelism, so that the displacement between the images could be a parallel displacement. Further, the two-dimensional simultaneous matching disclosed in Non-Patent Document 8 was used for the registration.

FIG. 5(A) shows a low-resolution image enlarged to the size of the high-resolution image. FIG. 5(B) shows the high-resolution image estimated by the conventional super-resolution processing method. FIG. 5(C) shows the high-resolution image estimated by the super-resolution processing method of the present invention. FIG. 5(A), FIG. 5(B) and FIG. 5(C) show a whole image on left side and an enlarged image of a part of each whole image on right side respectively.

When FIG. 5(A), FIG. 5(B) and FIG. 5(C) are compared with each other, both FIG. 5(B) and FIG. 5(C) have an improved resolution compared to the low-resolution image of FIG. 5(A). As a subjective evaluation, it is clear that FIG. 5(B) and FIG. 5(C) seem to have the same quality even when they are enlarged. Although it is impossible to be compared with the true value, RMS error of the entire image which represents the difference between the output image by the conventional super-resolution processing method and the output image by the super-resolution processing method of the present invention, was 2.5.

Same as the comparison between the super-resolution processing by the conventional super-resolution processing method and the super-resolution processing by the super-resolution processing method according to the present invention by using synthetic image, TABLE 3 summarizes the comparison of the computation times required for the super-resolution processing between the conventional super-resolution processing method and the super-resolution processing method according to the present invention by using actual image (1).

TABLE 3

Comparison between the conventional super-resolution processing method and the present invention's super-resolution processing method (in the case of using actual image (1))

| | Super-resolution processing method | | |
|---|---|---|---|
| | (a) | (b) | (c) |
| Number of PSF kernels | 307200 | 307200 | 9 |
| Number of times for convolution operation | 307200 | 307200 | 210816 |
| Preparation time [sec] | 1.5 | 11.6 | 1.6 |
| Iteration time [sec] | 386.9 | 25.4 | 9.8 |
| Total computation time [sec] | 388.4 | 37.0 | 11.4 |
| Total time ratio | 34.1 | 3.2 | 1.0 |

As is understood from TABLE 3, and also in the case of actual image (1), the super-resolution processing method of the present invention is 34.1 times faster than the conventional super-resolution processing method (a), and 3.2 times faster than the conventional super-resolution processing method (b).

Next, similar super-resolution processing was performed for the moving images taken by a hand-held camera. Since the observed images (the low-resolution images) were taken by a hand-held camera as the imaging device, a projective transformation was assumed and the registration was performed.

The simultaneous estimation method disclosed in Non-Patent Document 9 was used for the estimation of the registration. When a projective transformation is considered, the PSF which is a transfer function from a high-resolution image to an observed image, also needs to be transformed correspondingly to the projective transformation in a precise manner (see Non-Patent Document 6). However, on the assumption that the projective transformation was small enough to ignore the PSF transformation, the super-resolution processing was performed by using the super-resolution processing method of the present invention.

Figure 6:
FIG. 6 is a diagram showing a result of the super-resolution processing by using actual image (2).

FIG. 6(A) shows the low-resolution image enlarged to the size of the high-resolution image. FIG. 6(B) shows the high-resolution image estimated by the conventional super-resolution processing method. FIG. 6(C) shows the high-resolution image estimated by the super-resolution processing method of the present invention. FIG. 6(D) shows the high-resolution image estimated by the conventional super-resolution processing method where the deformation of the PSF has been taken into consideration. FIG. 6(A), FIG. 6(B), FIG. 6(C) and FIG. 6(D) show a whole image on left side and an enlarged image of a part of each whole image on right side respectively.

In the case of using actual image (2), FIG. 6(B), FIG. 6(C) and FIG. 6(D) have an improved resolution in comparison to FIG. 6(A). When each enlarged image of FIG. 6(B), FIG. 6(C) and FIG. 6(D) are compared, there is almost no difference among them.

When the deformation of the PSF is ignored, TABLE 4 summarizes the comparison between the computation times required for the super-resolution processing by the conventional super-resolution processing method and the super-resolution processing method of the present invention in the case where actual image (2) were used.

TABLE 4

Comparison between the conventional super-resolution processing method and the present invention's super-resolution processing method (in the case of using actual image (2))

| | Super-resolution processing method | | |
|---|---|---|---|
| | (a) | (b) | (c) |
| Number of PSF kernels | 307705 | 307705 | 9 |
| Number of times for convolution operation | 307705 | 307705 | 220358 |
| Preparation time [sec] | 1.5 | 11.7 | 1.6 |
| Iteration time [sec] | 388.2 | 25.6 | 10.4 |
| Total computation time [sec] | 389.7 | 37.3 | 12.0 |
| Total time ratio | 32.5 | 3.1 | 1.0 |

As understood from TABLE 4, and similarly to the case of using actual image (1), the super-resolution processing method of the present invention is 32.5 times shorter than the conventional super-resolution processing method (a), and 3.1 times shorter than the conventional super-resolution processing method (b) in terms of computation time.

As described above, instead of estimating for all pixels of multiple low-resolution images, the present invention divides the high-resolution image space into multiple small areas and approximates the estimated value of each divided small area to be constant. That is, for the coordinate position of pixels within the small area, the estimated value of the representative point in each small area is approximately regarded as the estimated value for all pixels within such a small area so that the calculation cost can be reduced by decreasing the number of times for estimation, and thus constitutes the major characteristic of the present invention.

Briefly, in the present invention, the comparison between the pixel value and the estimated value of each pixel within the small area can be performed, even one estimation is performed for each small area (estimation for the representative point of the small area). Therefore, the reduction of the number of times for estimation leads directly to the speeding up of the super-resolution processing. Moreover, as described above, the realization of speeding up of the super-resolution processing was verified by the application of the fast method of super-resolution processing according to the present invention for both synthetic image and two kinds of actual images.

It is preferable to apply the fast method of super-resolution processing according to the present invention to the MPA method in order to reduce the number of times for estimation of the pixels of multiple low-resolution images from a high-resolution image. However, the fast method of super-resolution processing according to the present invention is not limited to the application to the MAP method. The present invention is also applicable to other super-resolution processing such as the ML method and POCS method.

INDUSTRIAL APPLICABILITY

As described above, the use of the fast method of super-resolution processing according to the present invention can achieve an excellent effect on the realization of speeding up of the super-resolution processing, wherein the present invention first performs the registration of multiple low-resolution images with the displacement in the high-resolution image space and deals with the observed multiple low-resolution images after the registration as the pixels sampled at unequal interval in the high-resolution image space, and then the high-resolution image space is divided into multiple small areas and the values estimated from the high-resolution image are approximated to be constant within each divided small area.

In addition, the realization of speeding up of the super-resolution processing was verified by the application of the fast method of super-resolution processing according to the present invention for both synthetic image and two kinds of actual images.

THE LIST OF REFERENCES

Non-Patent Document 1:
Sung C. P. and Min. K. P., "Super-Resolution Image Reconstruction—A Technical Overview—," IEEE Signal Processing Magazine, vol. 26, no. 3, p. 21-36, 2003.
Non-Patent Document 2:
B. C. Tom and A. K. Katsaggelos, "Reconstruction of a high-resolution image by simultaneous registration, restoration, and interpolation of low-resolution images," Proceedings of the IEEE International Conference on Image Processing, vol. 2, p. 539-542, 1995.
Non-Patent Document 3:
R. R. Schulz and R. L. Stevenson, "Extraction of high-resolution frames from video sequences," IEEE Transactions on Image Processing, vol. 5, p. 996-1011, 1996.
Non-Patent Document 4:
H. Stark and P. Oskoui, "High resolution image recovery from image-plane arrays, using convex projections," Journal of the Optical Society of America, Series A., vol. 6, p. 1715-1726, 1989.
Non-Patent Document 5:
B. Zitová and J. Flusser, "Image registration methods: a survey," Image and Vision Computing, vol. 21, no. 11, p. 977-1000, 2003.
Non-Patent Document 6:
D. Capel, "Image Mosaicing and Super-Resolution," Springer, 2003.
Non-Patent Document 7:
W. H. Press and S. A. Teukolsky et al., "Numerical Recipes in C++," Cambridge University Press, 2002.
Non-Patent Document 8:
M. Shimizu and M. Okutomi, "Two-Dimensional Simultaneous Sub-Pixel Estimation on Area-Based Image Matching," The transactions of the Institute of Electronics, Information and Communication Engineers D-II, vol. 87-D-II, no. 2, p. 554-564, 2004.
Non-Patent Document 9:
M. Shimizu, T. Yano, and M. Okutomi, "Precise Simultaneous Estimation of Deformation N-Parameters Extended from Two-Dimensional Simultaneous Estimation," IPSJSIG Notes. 2004-CVIM-143, vol. 2004, no. 26, p. 81-88, 2004.

What is claimed is:

1. A method of estimating, using a processor, a high-resolution image from multiple low-resolution images with a displacement, the method comprising:
    performing a registration of said multiple low-resolution images in a high-resolution image space;
    dividing said high-resolution image space into a plurality of areas with a predefined size; and
    defining estimated pixel values of all pixels that exist within at least one of said plurality of areas so as to be the same as an estimated pixel value of a pixel at a predefined representative position within said at least one of said plurality of areas.

2. A method of estimating, using a processor, a high-resolution image from multiple low-resolution images with a displacement, the method comprising:
    performing a registration of said multiple low-resolution images in a high-resolution image space;
    dividing said high-resolution image space into a plurality of areas with a predefined size; and
    defining estimated pixel values of all pixels that exist within at least one of said plurality of areas so as to be the same as an estimated pixel value of a pixel at a predefined representative position within said at least one of said plurality of areas,
    wherein said at least one plural area has a shape of a square.

3. A method of estimating, using a processor, a high-resolution image from multiple low-resolution images with a displacement, the method comprising:
    performing a registration of said multiple low-resolution images in a high-resolution image space;
    dividing said high-resolution image space into a plurality of areas with a predefined size;
    defining estimated pixel values of all pixels that exist within at least one of said plurality of areas so as to be the same as an estimated pixel value of a pixel at a predefined representative position within said at least one of said plurality of areas,
    wherein said at least one of said plurality of areas has a shape of a square and a size of one side of said square is one integer-th of a pixel size of said high-resolution image.

4. A method of estimating, using a processor, a high-resolution image from multiple low-resolution images with a displacement, the method comprising:
    performing a registration of said multiple low-resolution images in a high-resolution image space;
    dividing said high-resolution image space into a plurality of areas with a predefined size; and defining estimated pixel values of all pixels that exist within at least one of said plurality of areas so as to be the same as an estimated pixel value of a pixel at a predefined representative position within said at least one of said plurality of areas, wherein said estimated pixel value of said pixel at said predefined representative position is calculated based on a convolution of said high-resolution image and a point-spread function obtained from a camera model.

5. A method according to any one of claims 1 to 4, wherein an evaluation function required for said estimating is expressed by the following expression:

$$I = \sum_{i=1}^{M} |f_i - \hat{f}(x_c, y_c)|^2$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i, y_i)$ within said at least one of said plurality of areas, $(x_c, y_c)$ represents said predefined representative position of said at least one of said plurality of areas, and $\hat{f}(x_c, y_c)$ represents said estimated pixel value of said pixel at said predefined representative position.

6. A method according to any one of claims 1 to 4, wherein an evaluation function required for said estimating is expressed by the following expression:

$$I = M|\bar{f} - \hat{f}(x_c, y_c)|^2$$

wherein $$\bar{f} = \frac{1}{M} \sum_{i=1}^{M} f_i$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i, y_i)$ within said at least one of said plurality of areas, $(x_c, y_c)$ represents said predefined representative position of said at least one of said plurality of areas, $\hat{f}(x_c, y_c)$ represents said estimated pixel value of said pixel at said predefined representative position, and $\bar{f}$ represents an average of said observed values of pixels within said at least one of said plurality of areas.

7. A method according to any one of claims 1 to 4, wherein an evaluation function required for said estimating is expressed by the following expression:

$$I = \sum_{i=1}^{M} w(x_i - x_c, y_i - y_c)|f_i - \hat{f}(x_c, y_c)|^2$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i, y_i)$ within said at least one of said plurality of areas, $(x_c, y_c)$ represents said predefined representative position of said at least one of said plurality of areas, $\hat{f}(x_c, y_c)$ represents said estimated pixel value of said pixel at said predefined representative position, and $w(x_i - x_c, y_i - y_c)$ is a weight function that represents a weight corresponding to said i-th pixel with said position coordinate $(x_i, y_i)$ within said at least one of said plurality of areas and a value of said weight function becomes smaller as said i-th pixel with said position coordinate $(x_i, y_i)$ draws away from said predefined representative position $(x_c, y_c)$.

8. A method according to any one of claims 1 to 4, wherein an evaluation function required for said estimating is expressed by the following expression:

$$I = W|\bar{f} - \hat{f}(x_c, y_c)|^2$$

wherein:

$$W = \sum_{i=1}^{M} w(x_i - x_c, y_i - y_c)$$

$$\bar{f} = \frac{1}{W} \sum_{i=1}^{M} w(x_i - x_c, y_i - y_c) f_i$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i, y_i)$ within said at least one of said plurality of areas, $(x_c, y_c)$ represents said predefined representative position of said at least one of said plurality of areas, $\hat{f}(x_c, y_c)$ represents said estimated pixel value of said pixel at said predefined representative position, and $w(x_i - x_c, y_i - y_c)$ is a weight function that represents a weight corresponding to said i-th pixel with said position coordinate $(x_i, y_i)$ within said at least one of said plurality of areas and a value of said weight function becomes smaller as said i-th pixel with said position coordinate $(x_i, y_i)$ draws away from said predefined representative position $(x_c, y_c)$, W is a total of said weight corresponding to each pixel within said at least one of said plurality of areas, and $\bar{f}$ represents a weighted average of said at least one of said plurality of areas.

9. A method of estimating, using a processor, a high-resolution image from multiple low-resolution images with a displacement, the method comprising:

performing a registration of said multiple low-resolution images in a high-resolution image space;

dividing said high-resolution image space into a plurality of areas with a predefined size; and defining estimated pixel values of all pixels that exist within at least one of said plurality of areas so as to be the same as an estimated pixel value of a pixel at a predefined representative position within said at least one of said plurality of areas, wherein said at least one of said plurality of areas has a shape of a square and said estimated pixel value of said predefined representative position is calculated based on a convolution of said high-resolution image and a point-spread function obtained from a camera model.

10. A method of estimating, using a processor, a high-resolution image from multiple low-resolution images with a displacement, the method comprising:

performing a registration of said multiple low-resolution images in a high-resolution image space;

dividing said high-resolution image space into a plurality of areas with a predefined size; and defining estimated pixel values of all pixels that exist within at least one of said plurality of areas so as to be the same as an estimated pixel value of a pixel at a predefined representative position within said at least one of said plurality of areas, wherein said at least one of said plurality of areas has a shape of a square, a size of one side of said square is one integer-th of a pixel size of said high-resolution image and said estimated pixel value of said predefined representative position is calculated based on a convolution of said high-resolution image and a point-spread function obtained from a camera model.

11. A method according to claim 9 or 10, wherein an evaluation function required for said estimating is expressed by the following expression:

$$I = \sum_{i=1}^{M} |f_i - \hat{f}(x_c, y_c)|^2$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i,y_i)$ within said at least one of said plurality of areas, $(x_c,y_c)$ represents said predefined representative position of said at least one of said plurality of areas, and $\hat{f}(x_c,y_c)$ represents said estimated pixel value of said predefined representative position.

12. A method according to claim 9 or 10, wherein an evaluation function required for said estimating is expressed by the following expression:

$$I = M|\tilde{f} - \hat{f}(x_c, y_c)|^2$$

wherein $$\tilde{f} = \frac{1}{M}\sum_{i=1}^{M} f_i$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i,y_i)$ within said at least one of said plurality of areas, $(x_c,y_c)$ represents said predefined representative position of said at least one of said plurality of areas, $\hat{f}(x_c,y_c)$ represents said estimated pixel value of said predefined representative position, and $\tilde{f}$ represents an average of said observed values of pixels within said at least one of said plurality of areas.

13. A method according to claim 9 or 10, wherein an evaluation function required for said estimating is expressed by the following expression:

$$I = \sum_{i=1}^{M} w(x_i - x_c, y_i - y_c)|f_i - \hat{f}(x_c, y_c)|^2$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i,y_i)$ within said at least one of said plurality of areas, $(x_c,y_c)$ represents said predefined representative position of said at least one of said plurality of areas, $\hat{f}(x_c,y_c)$ represents said estimated pixel value of said predefined representative position, and $w(x_i-x_c,y_i-y_c)$ is a weight function that represents a weight corresponding to said i-th pixel with said position coordinate $(x_i,y_i)$ within said at least one of said plurality of areas and a value of said weight function becomes smaller as said i-th pixel with said position coordinate $(x_i,y_i)$ draws away from said predefined representative position $(x_c,y_c)$.

14. A method according to claim 9 or 10, wherein an evaluation function required for said estimating is expressed by the following expression:

$$I = W|\bar{f} - \hat{f}(x_c, y_c)|^2$$

wherein $$W = \sum_{i=1}^{M} w(x_i - x_c, y_i - y_c)$$

$$\bar{f} = \frac{1}{W}\sum_{i=1}^{M} w(x_i - x_c, y_i - y_c)f_i$$

where, I represents said evaluation function for said at least one of said plurality of areas, M represents the number of said plurality of pixels that are included in said at least one of said plurality of areas, $f_i$ represents an observed value of an i-th pixel with a position coordinate $(x_i,y_i)$ within said at least one of said plurality of areas, $(x_c,y_c)$ represents said predefined representative position of said at least one of said plurality of areas, $\hat{f}(x_c,y_c)$ represents said estimated pixel value of said predefined representative position, and $w(x_i-x_c,y_i-y_c)$ is a weight function that represents a weight corresponding to said i-th pixel with said position coordinate $(x_i,y_i)$ within said at least one of said plurality of areas and a value of said weight function becomes smaller as said i-th pixel with said position coordinate $(x_i,y_i)$ draws away from said predefined representative position $(x_c,y_c)$, W is a total of said weight corresponding to each pixel within said at least one of said plurality of areas, and $\bar{f}$ represents a weighted average of said at least one of said plurality of areas.

* * * * *